United States Patent
Brickell et al.

(10) Patent No.: US 8,874,900 B2
(45) Date of Patent: *Oct. 28, 2014

(54) DIRECT ANONYMOUS ATTESTATION SCHEME WITH OUTSOURCING CAPABILITY

(75) Inventors: Ernie Brickell, Hillsboro, OR (US); Jiangtao Li, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 227 days.

This patent is subject to a terminal disclaimer.

(21) Appl. No.: 13/398,626

(22) Filed: Feb. 16, 2012

(65) Prior Publication Data
US 2012/0159155 A1  Jun. 21, 2012

Related U.S. Application Data

(63) Continuation of application No. 12/286,303, filed on Sep. 29, 2008, now Pat. No. 8,145,897.

(51) Int. Cl.
H04L 9/32 (2006.01)
H04L 9/30 (2006.01)

(52) U.S. Cl.
CPC ............ *H04L 9/3234* (2013.01); *H04L 9/3218* (2013.01); *H04L 9/3255* (2013.01); *H04L 9/3073* (2013.01); *H04L 2209/42* (2013.01)
USPC ............................. 713/155; 713/176; 380/277

(58) Field of Classification Search
USPC ........ 713/155, 176, 180; 726/5; 380/277, 283
See application file for complete search history.

(56) References Cited

U.S. PATENT DOCUMENTS

| | | | |
|---|---|---|---|
| 4,529,870 A | 7/1985 | Chaum | |
| 7,454,611 B2 | 11/2008 | Brickell | |
| 7,490,070 B2 | 2/2009 | Brickell | |
| 7,555,652 B2 | 6/2009 | Camenisch | |
| 7,581,107 B2 | 8/2009 | Camenisch | |
| 7,751,568 B2 | 7/2010 | Catherman et al. | |
| 2004/0260926 A1 | 12/2004 | Arditti Modiano et al. | |
| 2005/0010535 A1 | 1/2005 | Camenisch | |
| 2005/0074126 A1 | 4/2005 | Stanko | |
| 2006/0010079 A1 | 1/2006 | Brickell | |
| 2007/0101138 A1 | 5/2007 | Camenisch | |
| 2007/0192580 A1 | 8/2007 | Challener et al. | |
| 2008/0016363 A1* | 1/2008 | Lapstun et al. | 713/176 |
| 2008/0016364 A1* | 1/2008 | Silverbrook et al. | 713/176 |
| 2008/0046581 A1 | 2/2008 | Molina et al. | |
| 2009/0019291 A1 | 1/2009 | Murray | |

FOREIGN PATENT DOCUMENTS

KR  10-2006-0003601  1/2006

OTHER PUBLICATIONS

Office Action for U.S. Appl. No. 11/778,804 dated Oct. 6, 2010, 27 pages.
Office Action for U.S. Appl. No. 11/778,804 dated May 25, 2011, 28 pages.

(Continued)

*Primary Examiner* — Krisna Lim
(74) *Attorney, Agent, or Firm* — Blakely, Sokoloff, Taylor & Zafman LLP

(57) ABSTRACT

A Direct Anonymous Attestation (DAA) scheme using elliptic curve cryptography (ECC) and bilinear maps. A trusted platform module (TPM) may maintain privacy of a portion of a private membership key from an issuer while joining a group. Moreover, the TPM can outsource most of the computation involved in generating a signature to a host computer.

14 Claims, 11 Drawing Sheets

(56) References Cited

OTHER PUBLICATIONS

Notice of Allowance for U.S. Appl. No. 11/778,804 dated Aug. 4, 2011, 9 pages.
Notice of Allowance for U.S. Appl. No. 11/948,861 dated Apr. 16 2010, 12 pages.
Notice of Allowance for U.S. Appl. No. 11/948,861 dated Jul. 23, 2010, 10 pages.
Notice of Allowance for U.S. Appl. No. 12/286,303 dated Nov. 17, 2011 7 pages.
Office Action for U.S. Appl. No. 12/286,303 dated Jul. 29, 2011, 11 pages.
Office Action for Application No. 200810133628.3 dated Feb. 3, 2012, 6 pages.
Office Action for Application No. 200810133628.3 dated Oct. 31, 2012, 6 pages.
Office Action for Application No. 10-2008-69771 dated Apr. 21, 2010, 6 pages.
Translation of Office Action for Japanese Patent Application No. 2008-179668 mailed Apr. 27, 2011, 5 pages.
Non-Final Office Action for China Application No. 200810133628.3 Mailed Nov. 12, 2010, 12 pages.
U.S. Appl. No. 12/208,989, entitled "An Apparatus and Method for a Direct Anonymous Attestation Scheme from Short-Group Signatures," filed Sep. 11, 2008.
Office Action for U.S. Appl. No. 11/948,862 mailed Jun. 14 2011, 23 pages.
"Elliptic Curve Diffie-Hellman Draft; Recommendation on Key Establishment Schemes", *NIST Special Publication 800-56* (Jan. 2003), pp. 1-70.
"Elliptic Curve Digital Signature Algorithm", *Digital Signature Standard (DSS)*; *FIPS Pub 186-2*; US Department of Commerce/ National Institute Standards and Technology, (Jan. 27, 2000), pp. 1-76.
Barker, Elaine, et al., "Recommendation for Pair-Wise Key Establishment Schemes Using Discrete Logarithm Cryptography (Revised)", *NIST Special Publication 800-56A*, (Mar. 2007), pp. 1-114
Boneh, et al., "Group Signatures with Verifier-Local Revocation", *CCS '04, ACM*, (Oct. 2004), 168-177.
Boneh, et al., "Short Group Signatures", *International Association for Cryptographic Research*, (2004), 41-55.
Brickell, Ernest F., et al., "An Apparatus and Method for a Direct Anonymous Attestation Scheme from Short-Groupo Signaures", U.S. Appl. No. 12/208,989, filed Sep. 11, 2008, pp. 1-30
Brickell, et al., "Direct 145 Anonymous Attestation", *CCS '04, ACM*, (Oct. 2004), 132-145.
Brickell, E., et al., "SafeID: A direct anonymous attestation scheme with enhanced revocation", Intel Corporation, (Apr. 26, 2007), 1-23.
Funabiki, N., et al., "A proposal of anonymous IEEE802.1X authetication protocol for wireless networks" *IEEE*, (Nov. 2006), 26-31.
Ge, H., et al., "A group signature scheme with signature claiming and variable linkability", *IEEE*, (2006), 497-504.
Intel Corporation, Korean Notice of Preliminary Rejection dated Apr. 21, 2010 for KR 10-2008-69771.
Tanaka, Daiji, et al., "Group Signature Scheme with an Efficient Revocation", *IPSJ SIG Technical Report*, Japan, Information Processing Society of Japan, Mar. 17, 2006, vol. 2006, No. 26 pp. 171-176.

\* cited by examiner

US 8,874,900 B2

DIRECT ANONYMOUS ATTESTATION SCHEME WITH OUTSOURCING CAPABILITY

RELATED APPLICATIONS

The present patent application is a Continuation of application Ser. No. 12/286,303, filed Sep. 29,2008, which is related to U.S. Pat. No. 7,844,614, issued Nov. 30, 2010, entitled "AN APPARATUS AND METHOD FOR ENHANCED REVOCATION OF DIRECT PROOF AND DIRECT ANONYMOUS ATTESTATION" and U.S. Pat. No. 8,078,876 issued Dec. 13, 2011, entitled "AN APPARATUS AND METHOD FOR DIRECT ANONYMOUS ATTESTATION FROM BILINEAR MAPS".

FIELD

The subject matter disclosed herein relates generally to cryptography.

RELATED ART

For many modern communication systems, the reliability and security of exchanged information is a significant concern. To address this concern, the Trusted Computing Platform Alliance (TCPA) developed security solutions for platforms. In accordance with a TCPA specification entitled "Main Specification Version 1.1b," published on or around Feb. 22, 2002, each personal computer (PC) is implemented with a trusted hardware device referred to as a Trusted Platform Module (TPM).

During operation, an outside party (referred to as a "verifier") may require authentication of the TPM. This creates two opposing security concerns. First, the verifier needs to be sure that requested authentication information is really coming from a valid TPM. Second, an owner of a PC including the TPM wants to maintain as much privacy as possible. In particular, the owner of the PC wants to be able to provide authentication information to different verifiers without those verifiers being able to determine that the authentication information is coming from the same TPM.

Direct Anonymous Attestation (DAA) is a cryptographic protocol which enables remote authentication of a trusted platform while preserving the user's privacy. Direct Anonymous Attestation (DAA) was adopted by the Trusted Computing Group as a method for remote anonymous authentication of Trusted Platform Module (TPM). The original DAA scheme is based on the strong RSA assumption and has long group public key and private keys and large signatures.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

One embodiment includes a Direct Anonymous Attestation (DAA) scheme using elliptic curve cryptography (ECC) and bilinear maps. In this embodiment, a trusted platform module (TPM) may maintain privacy of a portion of a private membership key from an issuer while joining a group. Maintaining privacy of the private membership key of a TPM may be useful to prevent activity of the TPM from being monitored. In addition, during signature generation, the TPM can outsource most of the computation involved in generating a signature to a host computer. Outsourcing computation may be used to reduce the time to generate a signature. Outsourcing computation may be desirable when the TPM has small storage capability and slow computation ability.

In one embodiment, a revocation check used for a platform to join a group is consistent with a revocation check to verify a signature of a platform during a verification. The revocation check computations can be performed over the same elliptic curve group. This feature may be useful during programming because it may reduce the amount of processes used.

Throughout the description and illustration of the various embodiments discussed hereinafter, coefficients, variables, and other symbols (e.g., "h") are referred to by the same label or name. Therefore, where a symbol appears in different parts of an equation as well as different equations or functional description, the same symbol is being referenced.

Figure 1:
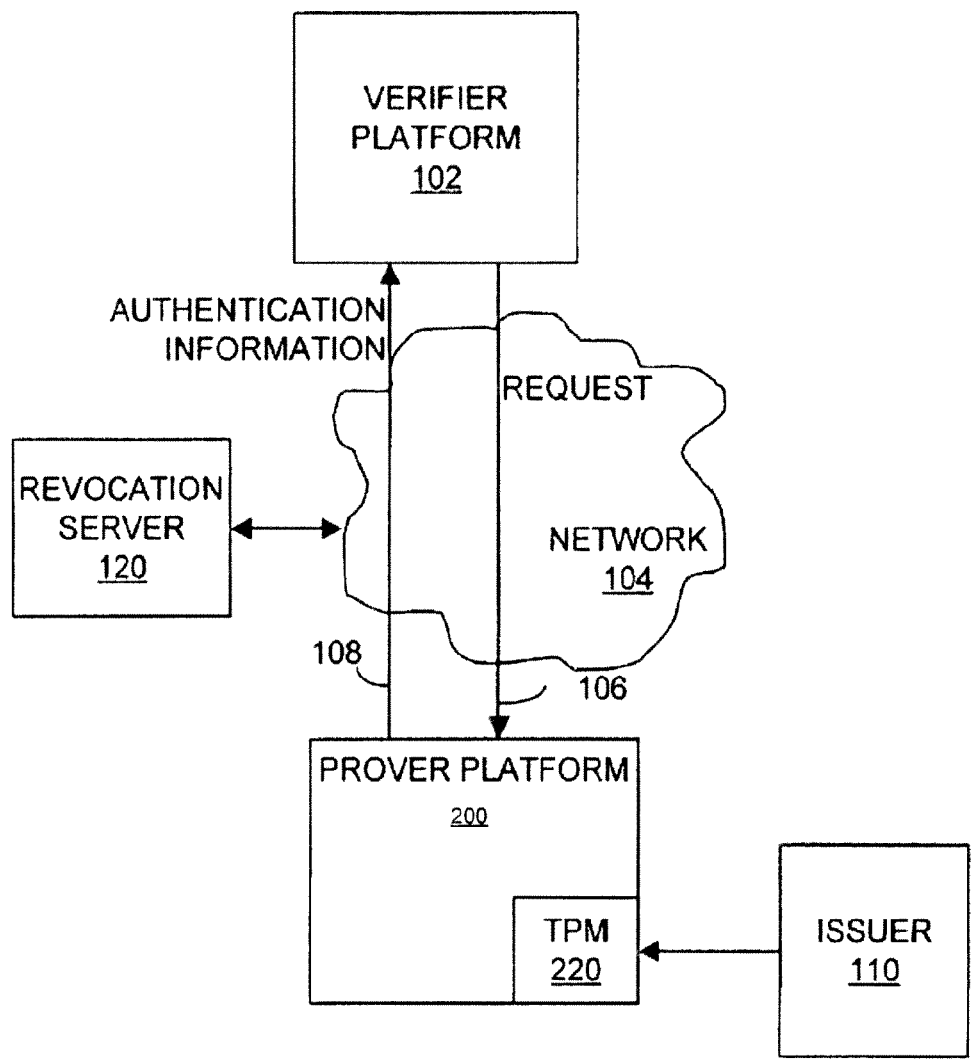
FIG. 1 illustrates a system featuring a platform implemented with a trusted hardware device in accordance with one embodiment.

FIG. 1 illustrates system 100 featuring a platform implemented with a trusted hardware device (referred to as "Trusted Platform Module" or "TPM") in accordance with one embodiment. A first platform 102 (Verifier) transmits an authentication request 106 to a second platform 200 ("prover") via network 120. In response to request 106, second platform 200 may provide the authentication information 108. In another embodiment, second platform 200 may provide the authentication information 108 to a verifier other than verifier 102. In one embodiment, network 120 forms part of a local or wide area network, and/or a conventional network infrastructure, such as an intranet, the Internet, or other like network.

Issuer 110 may be an entity that establishes that a person (or an entity) is a member of a group, and then issues a credential to the member. Prover 200 may try to prove membership in the group. If prover 200 is a member in the group and has a valid credential, the proof may be successful. Verifier 102 may try to establish whether prover 200 is a member of the group or not.

In one embodiment, prover 200 can be a processor or graphics processor made by a first manufacturer and verifier 102 may attempt to determine whether prover 200 is manufactured by the first manufacturer. Verifier 102 may want to determine that prover 200 is hardware as opposed to software simulating hardware. For example, in a case where sensitive information (such as copyrighted video) is to be transmitted to a processor, verifier 102 may verify that processor as opposed to being software emulating a processor.

Figure 2:
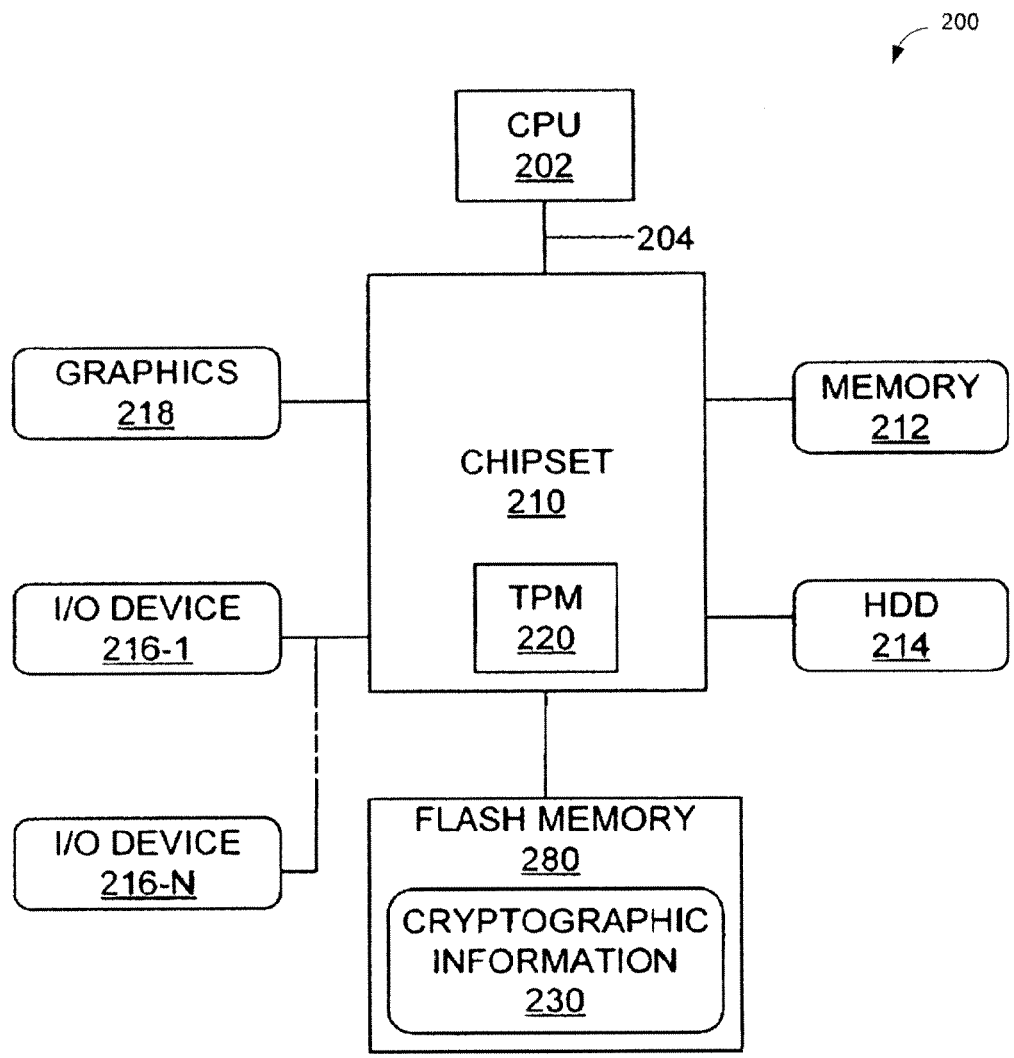
FIG. 2 is a block diagram further illustrating a platform in accordance with one embodiment.

FIG. 2 is a block diagram of platform 200, in accordance with one embodiment. Platform 200 may include a processor system bus (front side bus (FSB)) 204 for communicating information between processor (CPU) 202 and chipset 210. TPM 220 may be communicatively coupled to second platform 200 using a bus. As described herein, the term "chipset" is used in a manner to collectively describe the various devices coupled to CPU 202 to perform desired system functionality. Graphics block 218, hard drive devices (HDD) 214, and main memory 212 may be coupled to chipset 210. In one embodiment, chipset 210 is configured to include a memory controller and/or an input/output (I/O) controller to communicate with I/O devices 216 (216-1, . . . , 216-N). In an alternate embodiment, chipset 210 is or may be configured to incorporate graphics block 218 and operate as a graphics memory controller hub (GMCH). In one embodiment, main memory 212 may include, but is not limited to, random access memory (RAM), dynamic RAM (DRAM), static RAM (SRAM), synchronous DRAM (SDRAM), double data rate (DDR) SDRAM (DDR-SDRAM), Rambus DRAM (RDRAM) or any device capable of supporting high-speed buffering of data. Herein, the term "host" and "host computer" may refer to portions of platform 200 other than TPM 220.

Figure 3:
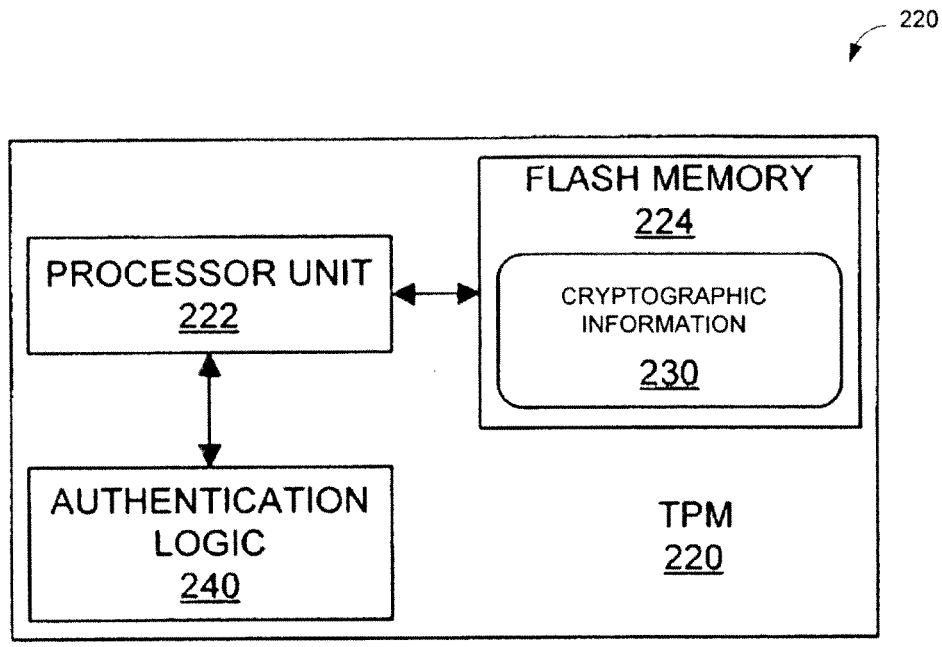
FIG. 3 further illustrates Trusted Platform Module (TPM) of the second platform, in accordance with one embodiment.

FIG. 3 illustrates a block diagram of Trusted Platform Module (TPM) 220 of second platform 200, in accordance with one embodiment. TPM 220 may be a cryptographic device that is manufactured by issuer 110. In one embodiment, TPM 220 includes processor unit 222 with on-chip memory encapsulated within a package. In one embodiment, TPM 220 also includes non-volatile memory 224 (e.g., flash) to permit storage of cryptographic information 230 such as one or more of the following: group public key and private membership key. Of course, it is contemplated that such information may be stored within external memory 280 of platform 200 in lieu of flash memory 224. The cryptographic information may be encrypted, especially if stored outside TPM 220.

In one embodiment, TPM 220 includes authentication logic 240 to respond to an authentication request from a verifier platform. In one embodiment, authentication logic 240 convinces or proves to the verifier platform that TPM 220 has stored cryptographic information issued by an issuer (e.g., a certifying device manufacturer), without revealing the cryptographic information or any unique device/platform identification information to the verifier. For example, authentication logic 240 may transmit information to an issuer to request to join a group without revealing the entire private key of the prover platform. For example, authentication logic 240 may transmit information to a verifier to verify a signature without revealing the entire private key of the prover platform. TPM 220 may utilize processes described hereafter to join a group and generate a signature.

Figure 4:
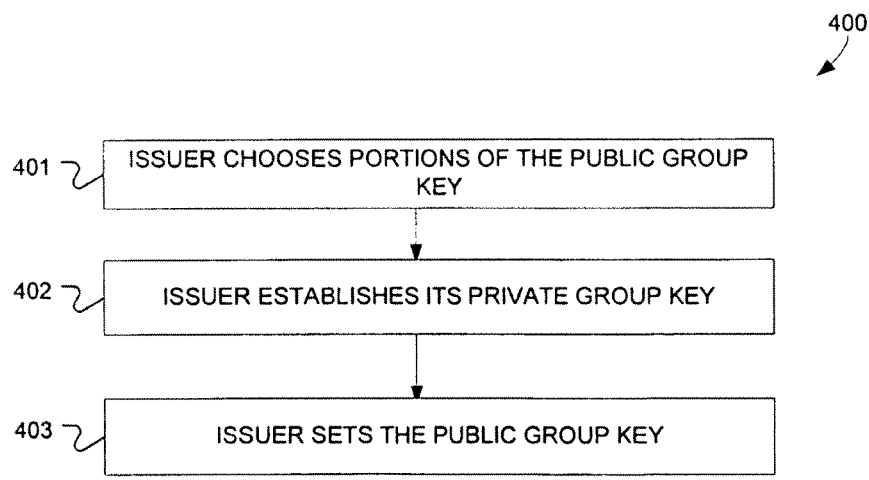
FIG. 4 depicts a process that may be used by an issuer to set up a group of secure members, in accordance with an embodiment.

FIG. 4 depicts a process 400 that may be used by an issuer to set up a group of secure members. Block 401 may include the issuer choosing portions of the public group key. $G_1$ and $G_2$ may be of prime order p with generators $g_1$ and $g_2$, respectively. Let e: $G_1 \times G_2 \rightarrow G_T$ be an efficiently computable bilinear map function with the following properties: (1) For all u in $G_1$ and v in $G_2$, for all integers a and b, $e(u^a, v^b) = e(u, v)^{ab}$; (2) $e(g1, g2)$ is not the identity of $G_T$; and (3) there exists an efficient algorithm for computing $e(u, v)$ for any u in $G_1$ and v in $G_2$. Group $G_3$ may be of prime order p with generator $g_3$ where decisional Diffie-Hellman problem in $G_3$ is hard. Note that the issuer could set $G_3$ to be the same group as $G_1$ or $G_T$.

Block 402 may include the issuer establishing its private group key. Block 402 may include the issuer selecting random $u_1, u_2, \gamma$ from $[1, p-1]$ and computing $h_1 = g_1^{u1}$, $h_2 = g_1^{u2}$, and $w = g_2^\gamma$. Values g1, g2, and g3 are elliptic curves. The issuer sets $(u_1, u_2, \gamma)$ as its private group key.

Block 403 may include the issuer setting the public group key based on the private group key and portions of the public group key. Block 403 may include the issuer setting the public group key as $(p, g_1, g_2, g_3, G_1, G_2, G_3, h_1, h_2, w)$. The public group key is used by members in a DAA group.

Figure 5:
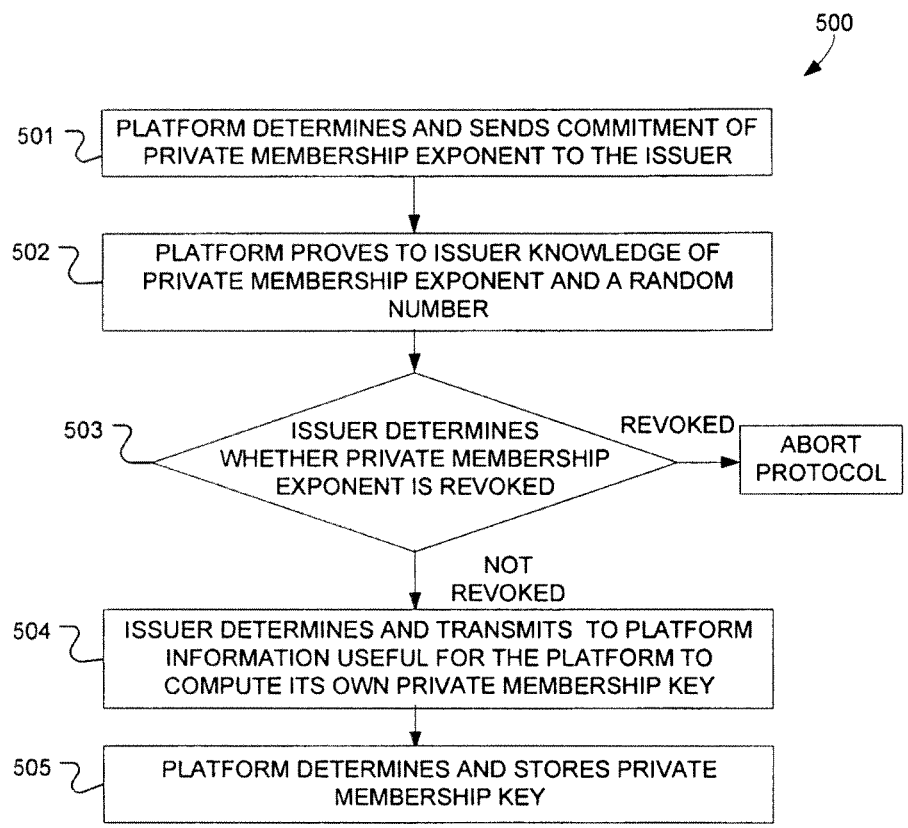
FIG. 5 depicts a process whereby a platform interacts with an issuer to join a group, in accordance with an embodiment.

FIG. 5 depicts a process whereby a platform (e.g., platform 200) that is not a member of a group interacts with an issuer (e.g., issuer 110) to join a group, in accordance with an embodiment. Block 501 may include the platform determining and transmitting a commitment of platform's private membership exponent to the issuer. Variable f may be a private membership exponent. Block 501 may include (1) the platform choosing f, y' from $[0, p-1]$ randomly; (2) the platform computing $B_1 = H_3(bsn_1)$ ($H_3(\bullet)$ is a collision resistant hash function that maps any length messages to random elements in $G_3$); (3) the platform computing $K = B_1^f$ and $T = h_1^f h_2^{y'}$; and (4) the platform transmitting K and T to the issuer. Variables K and T may be a commitment of private membership exponent.

Block 502 may include the platform proving to the issuer knowledge of the private membership exponent and a random number such that an equation known by both platform and issuer is satisfied. Block 502 may involve a zero knowledge proof. Block 502 may include the platform proving to the issuer the knowledge of (f, y') such that $K = B_1^f$, and $T = h_1^f h_2^{y'}$. Value y' may be a random value.

Block 503 may include the issuer determining whether the private membership exponent is in a revocation list. Block 503 may include the issuer computing $B_1 = H_3(bsn_1)$ and checking for all f in the revocation list whether $K \neq B_1^f$. If the issuer finds that the platform has been revoked (i.e., there exists an f in the revocation list such that $K = B_1^f$), it aborts the protocol.

Block 504 may include the issuer determining and transmitting to the platform information useful for the platform to compute its own private membership key. Block 504 may involve a blinding process such that issuer does not know the private membership exponent and the platform does not reveal the platform's private membership exponent to the issuer. Block 504 may include:
(1) the issuer choosing at random x, y" in $[0, p-1]$;
(2) the issuer computing $A = (g_1 \cdot T \cdot h_2^{y''})^{1/(\gamma + x)}$; and
(3) the issuer sending (A, x, y') to the platform.

Variable y" can be used by the platform to determine y, which is part of a private membership key. In this case, the issuer knows y" and the platform knows y' but the platform hides y' from issuer.

Block 505 may include the platform computing the private membership key. Block 505 may include (1) the platform computing y=y'+y" mod p and (2) the platform storing (A, x, y, f) as its private membership key. For example, the platform may store its private membership key in flash memory. The private membership key may be used to sign a DAA message.

Figure 6:
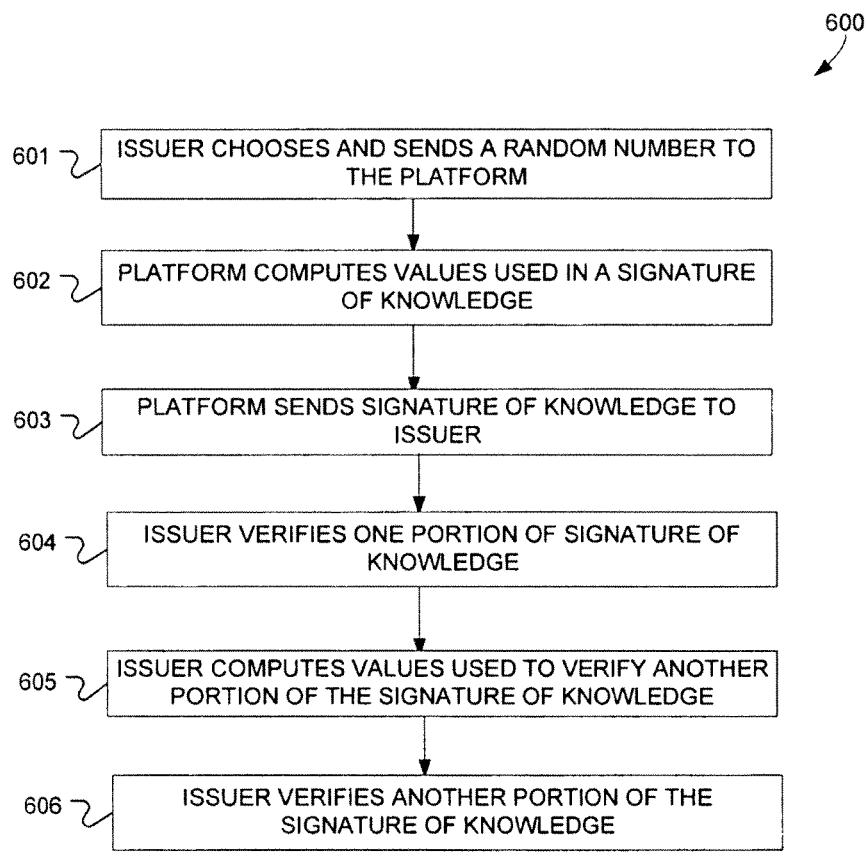
FIG. 6 depicts a process of proving knowledge, in accordance with an embodiment.

The proof of knowledge of (f, y') in block 502 may include acts of process 600 of FIG. 6. Block 601 may include the issuer choosing a random number and sending the random number to the platform. Block 601 may include the issuer choosing a random number $n_1$ in [0, p−1] and sending $n_1$ to the platform.

Block 602 may include the platform computing values used in a signature of knowledge. Block 602 may include (1) the platform choosing at random rf and ry in [0, p−1] and computing $R_1=B_1^{rf}$ and $R_2=h_1^{rf} \cdot h_2^{ry}$; (2) the platform computing $c=H(p, g_1, g_2, g_3, h_1, h_2, w, B_1, K, T, R_1, R_2, n_1)$ ($H(\cdot)$ is a collision resistant hash function that maps any length messages to elements in [0, p−1]; and (3) the platform computing sf=rf+c·f mod p and sy=ry+c·y' mod p.

Block 603 may include the platform sending a signature of knowledge to the issuer. Block 603 may include the platform sending (c, sf, sy) to the issuer.

Block 604 may include the issuer verifying the signature of knowledge. Block 604 may include the issuer verifying that (1) K is an element in $G_3$; (2) T is an element in $G_1$; and (3) sf, sy are integers in [0, p−1].

Block 605 may include the issuer determining values used to verify another portion of the signature of knowledge. Block 605 may include the issuer computing $$R_1=B_1^{sf} \cdot K^{-c}$$

and $$R_2=h_1^{sf} \cdot h_2^{sy} \cdot T^{-c}.$$

Block 606 may include the issuer verifying another portion of the signature of knowledge. Block 606 may include the issuer verifying that $c=H(p, g_1, g_2, g_3, h_1, h_2, w, B_1, K, T, R_1, R_2, n_1)$.

In another embodiment, if the platform trusts the issuer to know the platform's private key, the following simplified join process may be used.
1. The issuer chooses at random f, x, y from [0, p−1].
2. The issuer computes $A=(g_1^{1+u1 \cdot f+u2 \cdot y})^{1/(\gamma+x)}$.
3. The issuer transmits (A, x, y, f) to the platform.
4. The platform saves (A, x, y, f) as its private membership key.

For example, the issuer could issue a group public key and private key to prover platform during fabrication of the platform.

Figure 7:
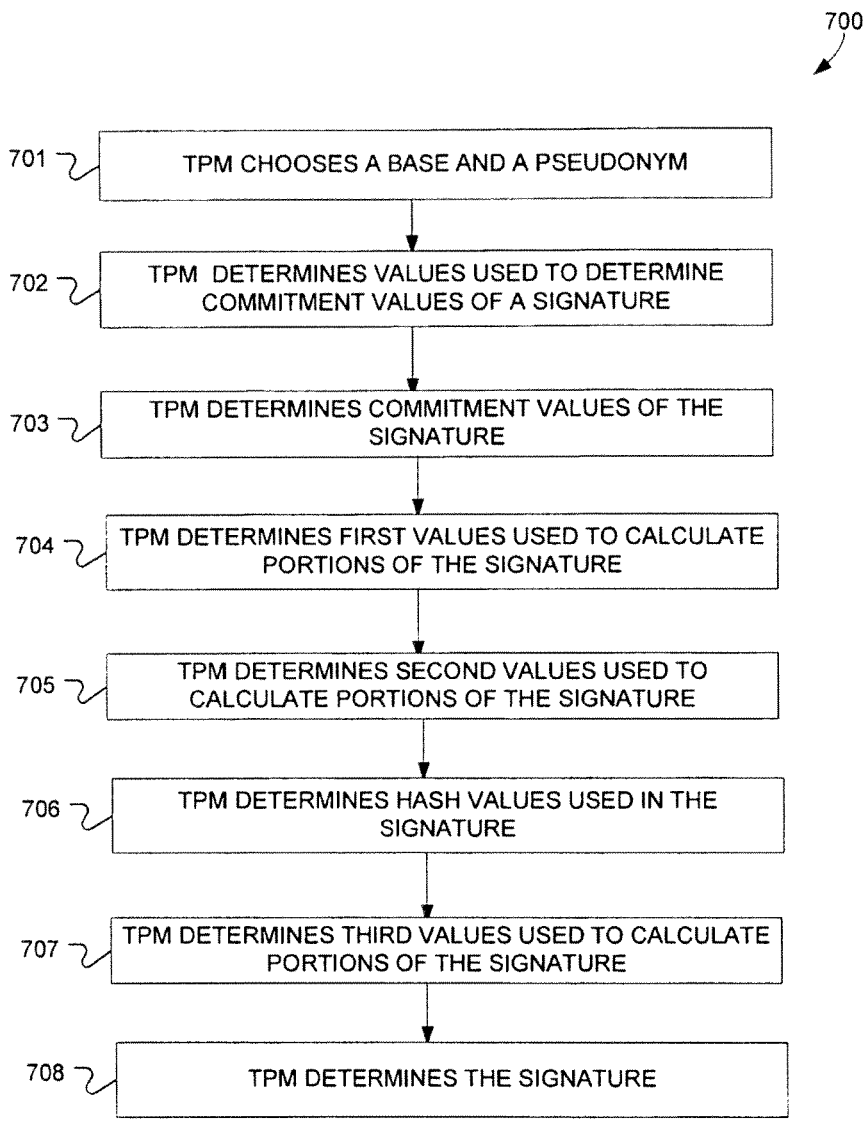
FIG. 7 depicts a process in which a platform creates a signature, in accordance with an embodiment.

FIG. 7 depicts a process 700 in which a platform creates a signature, in accordance with an embodiment. In response to a message m from a verifier with a basename value $bsn_v$ provided by the verifier, a platform may create a signature and transmit the signature to a verifier. Given a group public key $(p, g_1, g_2, g_3, G_1, G_2, G_3, h_1, h_2, w)$ and the platform's private membership key (A, x, y, f), the TPM computes the signature in accordance with process 700.

Block 701 may include the TPM determining a base and a pseudonym. Block 701 may include the TPM computing base B as follows. For a name base option, the TPM computes $B \leq H_3(bsn_v)$. For a random base option, the TPM chooses a random B from $G_3$. The TPM then computes pseudonym, $K=B^f$.

Block 702 may include the TPM determining values used to determine commitment values of a signature. Block 702 may include the TPM selecting values a, b randomly from [0, p−1].

Block 703 may include the TPM determining commitment values of a signature. Block 703 may include the TPM computing commitment values $T_1$ and $T_2$ as follows: $T_1=A \cdot h_2^a$ and $T_2=h_1^a \cdot h_2^b$.

Block 704 may include the TPM determining first values used to calculate portions of the signature. Block 704 may include the TPM computing values d and e that are used to calculate portions of the signature as follows: d=x·a mod p and e=x·b mod p.

Block 705 may include the TPM determining second values used to calculate portions of the signature. Block 705 may include the TPM randomly picking six integers rx, ry, rf, ra, rb, rd, re from [0, p−1]. Values rx, ry, rf, ra, rb, rd, re may not be released to the verifier. In addition, block 705 may include the TPM computing $$R_1=h_1^{ra} \cdot h_2^{rb}, \qquad (1)$$

$$R_2=h_1^{rd} \cdot h_2^{re} \cdot T_2^{-rx}, \qquad (2)$$

$$R_3=B^{rf}, \qquad (3)$$

and $$R_4=e(T_1, g_2)^{-rx} \cdot e(h_1, g_2)^{rf} \cdot e(h_2, g_2)^{ry+rd} \cdot e(h_2, w)^{ra}. \qquad (4)$$

In addition, block 705 may include the TPM determining a random integer used in the signature. Block 705 may include the TPM choosing a random 80-bit integer nd.

Block 706 may include the TPM determining a hash value used in the signature. Block 706 may include the TPM computing (1) $H_x=H(p, g_1, g_2, g_3, h_1, h_2, w, B, K, T_1, T_2, R_1, R_2, R_3, R_4)$ and then (2) $c=H(H_x, nd, m)$.

Block 707 may include the TPM determining third values used in the signature. Block 707 may include the TPM determining:

$$sx=rx+c \cdot x \pmod{p}, \qquad (1)$$

$$sy=ry+c \cdot y \pmod{p}, \qquad (2)$$

$$sf=rf+c \cdot f \pmod{p}, \qquad (3)$$

$$sa=ra+c \cdot a \pmod{p}, \qquad (4)$$

$$sb=rb+c \cdot b \pmod{p}, \qquad (5)$$

$$sd=rd+c \cdot d \pmod{p}, \qquad (6)$$

and $$se=re+c \cdot e \pmod{p}. \qquad (7)$$

Block 708 may include the TPM determining a signature. Block 708 may include the TPM setting the signature $\sigma=(B, K, T_1, T_2, c, nd, sx, sy, sf, sa, sb, sd, se)$. The TPM may transmit the signature to a verifier.

Figure 8:
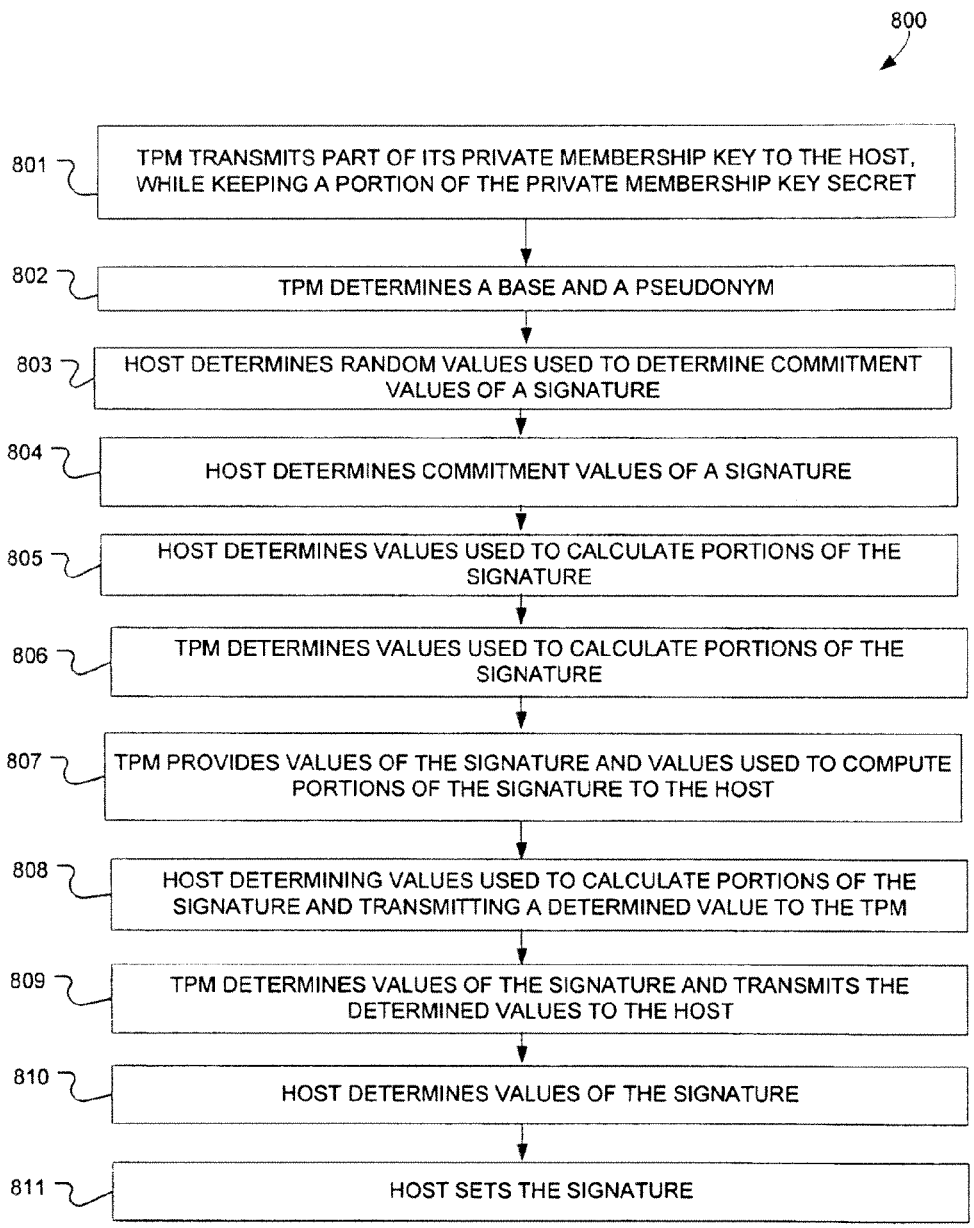
FIG. 8 depicts a process of splitting computation between the TPM and the host for generating a signature, in accordance with an embodiment.

In signature generating process 700 of FIG. 7, the TPM performs all computations. FIG. 8 depicts a process of splitting computation between the TPM and the host for generating a signature, in accordance with an embodiment. In other words, the TPM outsources most of the computation to a host according to process 800. In one embodiment, the host is part of platform 200. However, the host could be a non-local host provided that the non-local host does not reveal portions of the private key to others.

Block 801 may include the TPM sending part of its private membership key (A, x, y) to the platform, while keeping f secret.

Block 802 may include the TPM determining a base B and a pseudonym K. Block 802 may include the TPM determining B as follows. For a name base option, the TPM computes $B=H_3(bsn_v)$. For a random base option, the TPM chooses a random B from $G_3$. The TPM then computes $K=B^f$.

Block 803 may include the platform determining random values used to determine commitment values of a signature. Block 803 may include the platform selecting randomly a, b from [0, p−1].

Block 804 may include the platform determining commitment values $T_1$ and $T_2$ of a signature. Block 804 may include the platform computing $T_1=A \cdot h_2^a$ and $T_2=h_1^a \cdot h_2^b$.

Block 805 may include the platform determining values used to calculate portions of the signature. Block 805 may include the platform calculating:

$$d = x \cdot a \bmod p \quad (1)$$

and $$e = x \cdot b \bmod p. \quad (2)$$

Block 806 may include the TPM determining values used to calculate portions of a signature. Block 806 may include the TPM randomly picking rf from [0, p−1] and the TPM computing:

$$Rd = h_1^{rf} \quad (1)$$

and $$R_3 = B^{rf} \quad (2)$$

Block 807 may include the TPM providing values of the signature and values used to compute portions of the signature to the platform. Block 807 may include the TPM transmitting B, K, Rd, $R_3$ to the platform.

Block 808 may include the platform determining values used to calculate portions of the signature and transmitting a determined value to the TPM. Block 808 may include the platform randomly picking six integers rx, ry, ra, rb, rd, re from [0, p−1]. In addition, block 808 may include the platform computing $$R_1 = h_1^{ra} \cdot h_2^{rb}, \quad (1)$$

$$R_2 = h_1^{rd} \cdot h_2^{re} \cdot T_2^{-rx}, \quad (2)$$

$$R_4 = e(T_1, g_2)^{-rx} \cdot e(Rd, g_2) \cdot e(h_2, g_2)^{ry+rd} \cdot e(h_2, w)^{ra}, \quad (3)$$

and $$H_x = H(p, g_1, g_2, g_3, h_1, h_2, w, B, K, T_1, T_2, R_1, R_2, R_3, R_4). \quad (4)$$

Block 808 may include the platform transmitting Hx to the TPM.

Block 809 may include the TPM determining values of the signature and transmitting the determined values to the platform. Block 809 may include the TPM choosing a random 80-bit integer nd. Block 809 may also include the TPM computing $$c = H(H_x, nd, m)$$

and $$sf = rf + c \cdot f \pmod p.$$

and transmitting (c, nd, sf) to the host.

Block 810 may include the host determining values of the signature. Block 810 may include the host computing $$sx = rx + c \cdot x \pmod p, \quad (1)$$

$$sy = ry + c \cdot y \pmod p, \quad (2)$$

$$sa = ra + c \cdot a \pmod p, \quad (3)$$

$$sb = rb + c \cdot b \pmod p, \quad (4)$$

$$sd = rd + c \cdot d \pmod p, \quad (5)$$

and $$se = re + c \cdot e \pmod p. \quad (6)$$

Block 811 may include the host setting the signature for the platform. Block 811 may include the host setting the signature $\sigma=(B, K, T_1, T_2, c, nd, sx, sy, sf, sa, sb, sd, se)$. The signature may be transmitted to a verifier.

Figure 9:
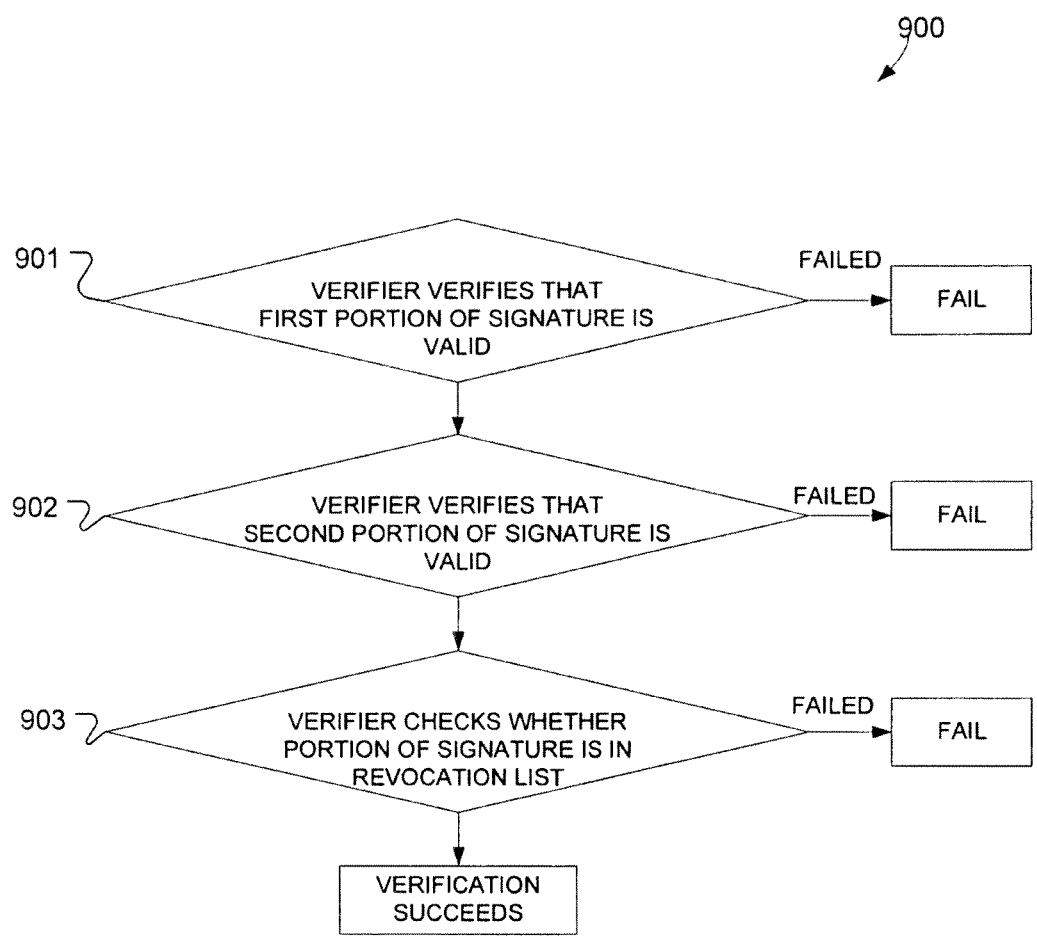
FIG. 9 depicts a process whereby a verifier can verify a signature from a platform, in accordance with an embodiment.

FIG. 9 depicts a process whereby a verifier can verify a signature from a platform, in accordance with an embodiment. Given a group public key (p, $g_1$, $g_2$, $g_3$, $G_1$ $G_2$, $G_3$, $h_1$, $h_2$, w) that is known by a verifier, a message m from the verifier, a basename $bsn_v$, and a group signature $\sigma=(B, K, T_1, T_2, c, nd, sx, sy, sf, sa, sb, sd, se)$, a verifier can verify the signature from a prover platform if all of the acts of process 900 are verified.

Block 901 may include the verifier verifying that a first portion of the group signature is correct. Block 901 may include the verifier (1) verifying that B, K are elements in $G_3$; (2) verifying that $T_1$, $T_2$ are elements in $G_1$; and (3) verifying that sx, sy, sf, sa, sb, sd, se are integers between [0, p−1]. Although not depicted, if the name base option is used, block 901 may include the verifier verifying that $B=H_3(bsn_v)$. If the first portion of the group signature is verified, then block 902 follows block 901. If any of the first portion of the group signature is incorrect, then the verification fails.

Block 902 may include the verifier verifying that a second portion of the group signature is correct. Block 902 may include (1) the verifier determining $R_1=h_1^{sa} \cdot h_2^{sb} \cdot T_2^{-c}$, $R_2=h_1^{sd} \cdot h_2^{se} \cdot T_2^{-sx}$, and $R_3=B^{sf} \cdot K^{-c}$; (2) the verifier determining $R_4=e(T_1, g_2)^{-sx} \cdot e(h_1, g_2)^{sf} \cdot e(h_2, g_2)^{sy+sd} \cdot e(h_2, w)^{sa} \cdot (e(g_1, g_2)/e(T_1, w))c$; and (3) the verifier verifying that $c=H(H(p, g_1, g_2, g_3, h_1, h_2, w, B, K, T_1, T_2, R_1, R_2, R_3, R_4)$, nd, m). If the second portion of the group signature is verified, then block 903 follows block 902. If any of the second portion of the group signature is incorrect, then the verification fails.

Block 903 may include the verifier checking whether a third portion of the group signature is not in a revocation list. Block 904 may include for each fi in the revocation list, the verifier checking that $K \neq B^{fi}$. If none of the third portion of the group signature is in a revocation list, then verification succeeds. If any of the third portion of the group signature is in a revocation list, then verification fails.

In one embodiment, the revocation check in block 503 (FIG. 5) in process 500 for a platform to join a group is similar to the revocation check in the verification process of block 903 (process 900). Both revocation checks can be performed over the same elliptic curve group G3.

Figure 10:
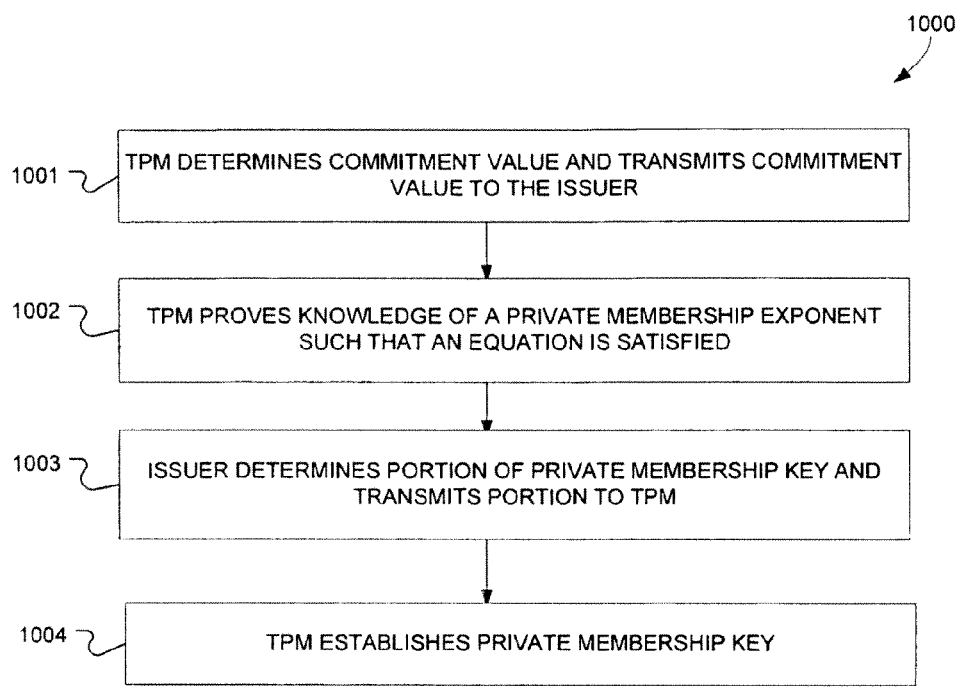
FIG. 10 depicts a process that can be used by a platform to join a group, in accordance with an embodiment.

FIG. 10 depicts a process 1000 that can be used by a platform to join a group, in accordance with an embodiment. Block 1001 may include the TPM choosing and transmitting a commitment of platform's private membership exponent to the issuer. Block 1001 may include (1) the platform choosing y, f' from [0, p−1] randomly, (2) the platform computing commitment value $T=h_1^y h_2^{f'}$ and (3) the platform transmitting T to the issuer.

Block 1002 may include the TPM proving to the issuer knowledge of the private membership exponent such that an equation known by both platform and issuer is satisfied. Block 1002 may include the platform proving to the issuer the knowledge of (y, f') such that $T=h_1^y h_2^{f'}$.

Block 1003 may include the issuer determining portions of the private membership key and determining values that can be used to determine a portion of the private membership key. Block 1003 may include the (1) issuer choosing at random x, f'' in [0, p−1], (2) the issuer computing $A=(g_1 \cdot T \cdot h_2^{f''}) r)^{1/(\gamma+x)}$, and (3) the issuer sending (A, x, f'') to the platform.

Block 1004 may include the TPM establishing the private membership key. Block 1004 may include (1) the platform computing f=f'+f'' mod p and (2) the platform storing (A, x, y, f) as its private membership key. For example, platform may store its private membership key in flash memory. The private membership key may be used to sign a message.

Figure 11:
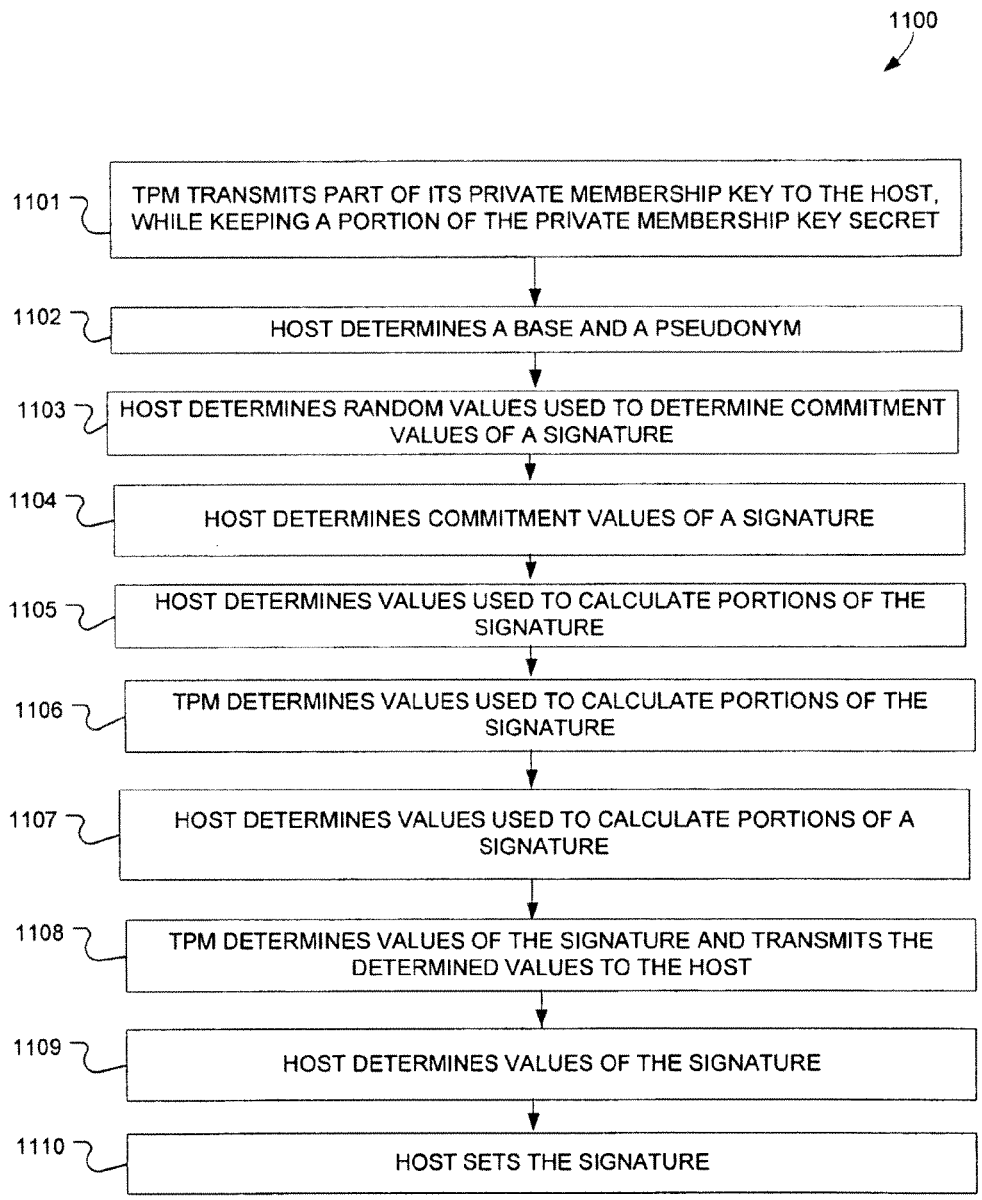
FIG. 11 depicts a process that can be used by a platform to generate a signature, in accordance with an embodiment.

FIG. 11 depicts a process 1100 that can be used by a platform to generate a signature, in accordance with an embodiment. Given a group public key (p, $g_1$, $g_2$, $g_3$, $G_1$ $G_2$, $G_3$, $h_1$, $h_2$, w), a user's private key (A, x, y, f), a message m, a basename value $bsn_v$ provided by the verifier, the platform computes the signature in the manner of process 1100. Process 1100 involves the TPM outsourcing determination of a private membership exponent to the host.

Block 1101 may include the TPM transmitting part of its private membership key to the host, while keeping part of the private membership key secret. Block 1101 may include the TPM sending part of its private membership key (A, x, f) to the host, while keeping y secret.

Block 1102 may include the host determining a base and a pseudonym. Block 1102 may include the host determining B as follows. In a name base option, the host computes $B=H_3(bsn_v)$. In a random base option, the host chooses a random B from $G_3$. The host then computes $K=B^f$.

Block 1103 may include the host determining random values used to determine portions of a signature. Block 1103 may include the host selecting randomly a, b from [0, p−1].

Block 1104 may include the host determining commitment values of a signature. Block 1104 may include the host computing $$T_1 = A \cdot h_2^a$$

and $$T_2 = h_1^a \cdot h_2^b.$$

Block 1105 may include the host determining values used to calculate portions of the signature. Block 1105 may include the host computing d=x·a mod p and e=x·b mod p.

Block 1106 may include the TPM determining values used to calculate portions of the signature. Block 1106 may include the TPM randomly picking ry from [0, p−1] and the TPM computing $Rd=h_1^{ry}$ and sending Rd to the host.

Block 1107 may include the host determining values used to calculate portions of the signature. Block 1107 may include the host randomly picking six integers rx, rf, ra, rb, rd, re from [0, p−1]. Block 1107 may also include the host computing (1) $R_1=h_1^{ra} \cdot h_2^{rb}$, (2) $R_2=h_1^{rd} \cdot h_2^{re} \cdot T_2^{-rx}$, (3) $R_3=B^{rf}$, and (4) $R_4=e(T_1, g_2)^{-re} \cdot e(Rd, g_2) \cdot e(h_2, g_2)^{ry+rd} \cdot e(h_2, w)^{ra}$. Block 1107 may include the host computing Hx=H(p, $g_1$, $g_2$, $g_3$, $h_1$, $h_2$, w, B, K, $T_1$, $T_2$, $R_1$, $R_2$, $R_3$, $R_4$) and transmitting Hs to the TPM.

Block 1108 may include the TPM determining values of the signature and the TPM transmitting values of the signature to the host. Block 1108 may include:

(1) TPM choosing a random 80-bit integer nd,
(2) TPM computing c=H($H_x$, nd, m),
(3) TPM computing sy=ry+c·y (mod p), and TPM transmitting (c, nd, sy) to the host.

Block 1109 may include the host determining portions of the signature. Block 1109 may include the TPM computing $$sx = rx + c \cdot x \pmod{p}, \quad (1)$$

$$sf = rf + c \cdot f \pmod{p}, \quad (2)$$

$$sa = ra + c \cdot a \pmod{p}, \quad (3)$$

$$sb = rb + c \cdot b \pmod{p}, \quad (4)$$

$$sd = rd + c \cdot d \pmod{p}, \quad (5)$$

and $$se = re + c \cdot e \pmod{p}. \quad (6)$$

Block 1110 may include the host determining a signature. Block 1110 may include the host setting the signature σ=(B, K, $T_1$, $T_2$, c, nd, sx, sy, sf, sa, sb, sd, se). The signature can be transmitted to a verifier.

By contrast, in process 800, the TPM may perform three exponentiations whereas in process 1100, the TPM may perform a single exponentiation. Accordingly, process 1100 may complete faster than process 800. However, there could be privacy concern with process 1100 because the host learns the private membership exponent and the host may be able to trace all the signatures created by the TPM and compromise the privacy of the TPM.

U.S. patent application Ser. No. 11/948,861 filed Nov. 30, 2007, entitled "AN APPARATUS AND METHOD FOR ENHANCED REVOCATION OF DIRECT PROOF AND DIRECT ANONYMOUS ATTESTATION," describes at its FIG. 10 and accompanying text a manner whereby a prover platform may respond to a received challenge request from a verifier. The process described with regard to that FIG. 10 can be modified in a manner described herein to permit the host, as opposed to the TPM, to respond to the received challenge request from a verifier. This may be possible because the host has knowledge of value f, the private membership exponent. Outsourcing the response to challenge to a host may increase speed of the response if the host has greater processing capabilities than those of the TPM.

Figure 12:
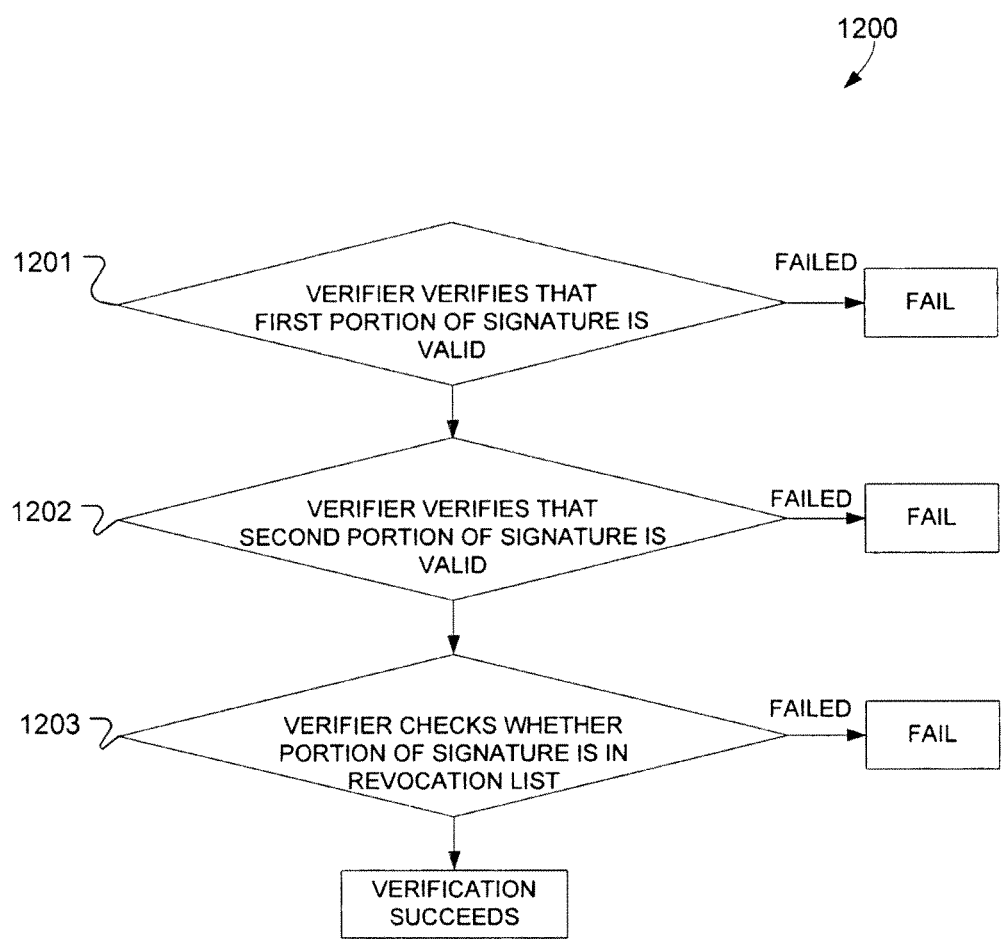
FIG. 12 depicts a process whereby a verifier can verify a signature from a platform, in accordance with an embodiment.

Given a group public key (p, $g_1$, $g_2$, $g_3$, $G_1$ $G_2$, $G_3$, $h_1$, $h_2$, w), a message m, a basename $bsn_v$, and a group signature σ=(B, K, $T_1$, $T_2$, c, nd, sx, sy, sf, sa, sb, sd, se), a verifier can verify the signature using process 1200 of FIG. 12.

Block 1201 may include the verifier verifying that a first portion of the group signature is correct. Block 1201 may include the verifier verifying that B, K are elements in $G_3$; verifies whether $T_1$, $T_2$ are elements in $G_1$; and verifies whether sx, sy, sf, sa, sb, sd, and se are integers between [0, p−1]. If any of the first portion of the group signature is incorrect, then the verification fails.

If the name base option is used, block 1201 may include the verifier checking that $B=H_3(bsn_v)$.

Block 1202 may include the verifier verifying that a second portion of the group signature is correct. Block 1202 may include (1) the verifier determining $R_1=h_1^{sa} \cdot h_2^{sb} \cdot T_2^{-c}$, $R_2=h_1^{sd} \cdot h_2^{se} \cdot T_2^{-sx}$, and $R_3=B^{sf} \cdot K^{-c}$; (2) the verifier determining $R_4=e(T_1, g_2)^{-sx} \cdot e(h_1, g_2)^{sy} \cdot e(h_2, g_2)^{sf+sd} \cdot e(h_2, w)^{sa} \cdot (e(g_1, g_2)/e(_1, w))^c$; and (3) the verifier verifying that c=H(H(p, $g_1$, $g_2$, $g_3$, $h_1$, $h_2$, w, B, K, $T_1$, $T_2$, $R_1$, $R_2$, $R_3$, $R_4$), nd, m). If any of the second portion of the group signature is incorrect, then the verification fails.

Block 1203 may include the verifier checking whether a third portion of the group signature is not in a revocation list. Block 1203 may include for each fi in the revocation list, the verifier checks that $K \neq B^{fi}$. If any of the third portion of the group signature is in a revocation list, then verification fails.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method for setting a signature for authentication for an encryption device, comprising:
   receiving a first portion of the signature from the encryption device, the encryption device requesting a host computer to generate a second portion of the signature while maintaining privacy of the first and second portion of the signature, the first portion of the signature including a private membership key;
   generating the second portion of the signature at the host computer including a private membership exponent; and
   sending the second portion of the signature to the encryption device.

2. The method of claim 1, wherein the generating the host portion of the signature at the second computer comprises:
   determining random values used to determine commitment values of the signature; and
   determining commitment values of the signature.

3. The method of claim 2, wherein determining random values used to determine commitment values of the signature includes the host computer selecting values a, b randomly from [0, p−1], and
   determining commitment values of the signature includes the host computer determining $T_1 = A \cdot h_2^a$ and $T_2 = h_1^a \cdot h_2^b$.

4. The method of claim 1, wherein the generating the second portion of the signature at the second computer comprises:
   the host computer determining:

$$d = x \cdot a \bmod p; \qquad (1)$$

$$e = x \cdot b \bmod p; \qquad (2)$$

the host computer randomly picking six integers rx, ry, ra, rb, rd, re from [0, p−1];
   the host computer determining:

$$R_1 h_1^{ra} \cdot h_2^{rb}; \qquad (1)$$

$$R_2 = h_1^{rd} \cdot h_2^{re} \cdot T_2^{-rx}; \qquad (2)$$

$$R_4 = e(T_1, g_2)^{-rx} \cdot e(Rd, g_2) \cdot e(h_2, g_2)^{ry+rd} \cdot e(h_2, w)^{ra}; \qquad (3);$$

and $$H_x = H(p, g_1, g_2, g_3, h_1, h_2, w, B, K, T_1, T_2, R_1, R_2, R_3, R_4). \qquad (4)$$

5. The method of claim 1, wherein the generating the second portion of the signature at the second computer comprises the second computer determining:

$$sx = rx + c \cdot x \pmod{p}, \qquad (1)$$

$$sy = ry + c \cdot y \pmod{p}, \qquad (2)$$

$$sa = ra + c \cdot a \pmod{p}, \qquad (3)$$

$$sb = rb + c \cdot b \pmod{p}, \qquad (4)$$

$$sd = rd + c \cdot d \pmod{p}, \qquad (5)$$

and $$se = re + c \cdot e \pmod{p}. \qquad (6)$$

6. The method of claim 1, wherein the generating the second portion of the signature at the host computer includes the host computer setting the signature as: $\sigma = (B, K, T_1, T_2, c, nd, sx, sy, sf, sa, sb, sd, se)$, wherein B, K, c, nd, and sf are received from the encryption device by the host computer.

7. The method of claim 1, wherein the encryption device is a trusted platform module and the host computer is communicatively coupled to the encryption device.

8. A method comprising:
   receiving from a first computer a request for admission to a group by an issuer computer while maintaining privacy of a first portion of a private membership key by including a commitment of the first portion from the first computer;
   validating a signature of the first computer by the issuer computer; and
   sending a second portion of a private membership key to the first computer to enable generation of a third portion of the private membership key.

9. The method of claim 8, wherein the first portion comprises a private membership exponent.

10. The method of claim 9, wherein the private membership exponent is selected at random from [0, p−1], where p is a prime order of a bilinear group associated with the group.

11. The method of claim 8, wherein the private membership key comprises A, x, y, f.

12. The method of claim 8, further comprising:
    determining whether the first computer is capable of joining the group; and
    determining whether the signature from the first computer is valid, wherein the determining whether a first computer is capable of joining a group and determining whether a signature from a first computer is valid both include performing the revocation check over the same elliptic curve group.

13. A non-transitory computer-readable medium having instructions stored herein, which when executed cause a computing device to perform a set of operations comprising:

receiving a first portion of the signature from the encryption device, the encryption device requesting a host computer to generate a second portion of the signature while maintaining privacy of the first and second portion of the signature, the first portion of the signature including a private membership key;

generating the second portion of the signature at the host computer including a private membership component; and sending the second portion of the signature to the encryption device.

14. A non-transitory computer-readable medium having instructions stored herein, which when executed cause a computing device to perform a set of operations comprising:

receiving from a first computer a request for admission to a group by an issuer computer while maintaining privacy of a first portion of a private membership key by including a commitment of the first portion from the first computer;

validating a signature of the first computer by the issuer computer; and sending a second portion of a private membership key to the first computer to enable generation of a third portion of the private membership key.

* * * * *